United States Patent [19]

Kishi et al.

[11] 4,350,057
[45] Sep. 21, 1982

[54] SHIFT CONTROL SYSTEM FOR A VEHICLE AUTOMATIC TRANSMISSION

[75] Inventors: Norimasa Kishi; Tadashi Suzuki, both of Yokosuka, Japan

[73] Assignee: Nissan Motor Co., Ltd., Yokohama, Japan

[21] Appl. No.: 135,155

[22] Filed: Mar. 28, 1980

[30] Foreign Application Priority Data

Apr. 3, 1979 [JP] Japan .................................. 54-39352

[51] Int. Cl.³ .............................................. B60K 41/06
[52] U.S. Cl. ........................................ 74/866; 74/861; 74/865; 74/877
[58] Field of Search ................. 74/866, 865, 861, 877, 74/843

[56] References Cited

U.S. PATENT DOCUMENTS 4,034,627  7/1977  Mizote .

4,285,252  8/1981  Yamaki et al.

FOREIGN PATENT DOCUMENTS

1440083  10/1975  United Kingdom .

Primary Examiner—Leslie Braun
Attorney, Agent, or Firm—Lane, Aitken, Kice & Kananen

[57] ABSTRACT

A signal from the speed sensor is extracted at a time period which is later than that for detecting a signal from the engine load sensor by a predetermined amount of time. The speed signal thus obtained is used to decide whether or not shifting of the automatic transmission is necessary, so that any incorrect changeover between two or more shift patterns or shifting between two or more shift positions in a shift pattern is prevented from being selected due to a delay in the response of the vehicle speed relative to the depression of the accelerator pedal.

6 Claims, 7 Drawing Figures

| (Address of ROM) | (a,b) | Programmed Acceleration | (Parameter Region in Fig.5A) |
|---|---|---|---|
| Tag1+0=000 | (0,0) | $\alpha_5$ | } 1 |
| Tag1+1=001 | (0,0) | $\alpha_{10}$ | |
| Tag1+2=002 | (1,0) | $\alpha_5$ | } 2 |
| | (1,0) | $\alpha_{10}$ | |
| ⋮ | | | |
| | (7,0) | $\alpha_5$ | } 8 |
| | (7,0) | $\alpha_{10}$ | |
| | (0,1) | $\alpha_5$ | } 9 |
| | (0,1) | $\alpha_{10}$ | |
| | (1,1) | $\alpha_5$ | } 10 |
| | (1,1) | $\alpha_{10}$ | |
| ⋮ | | | |
| Tag1+70=070 | (3,4) | $\alpha_5$ | } 36 |
| Tag1+71=071 | (3,4) | $\alpha_{10}$ | |
| ⋮ | | | |
| Tag1+126=126 | (7,7) | $\alpha_5$ | } 64 |
| Tag1+127=127 | (7,7) | $\alpha_{10}$ | |

SHIFT CONTROL SYSTEM FOR A VEHICLE AUTOMATIC TRANSMISSION

BACKGROUND OF THE INVENTION

1. Field of the Invention

The present invention relates to a shift control system for a vehicle automatic transmission, which comprises engine load sensor means for producing a signal corresponding to the engine load; vehicle speed sensor means for producing a signal corresponding to an actual vehicle speed; and means responsive to said signals from both of said engine load and speed sensor means for selecting a reference shifting speed corresponding to an associated engine load from at least one predetermined relationship between the engine load and a plurality of reference shifting speeds, for comparing said selected reference shifting speed with the actual vehicle speed and for deciding whether shifting is needed or not.

The invention also relates to a shift control system for a vehicle automatic transmission, which comprises engine load sensor means for producing a signal corresponding to the engine load; vehicle speed sensor means for producing a signal corresponding to an actual vehicle speed; means responsive to the signals from said engine load sensor means and said vehicle speed sensor means and a signal indicative of an associated shift position of the automatic transmission for determining a programmed acceleration corresponding to the engine load, the actual vehicle speed and the associated shift position; means responsive to the signal from said engine load sensor means for producing an actual acceleration; and means responsive to said programmed acceleration and said actual acceleration for selecting a desired one of two or more kinds of predetermined relationships (shift patterns) between the engine load and a plurality of reference shifting speeds, a reference shifting speed corresponding to the relevant engine load given from the selected relationship between the engine load and the reference shifting speeds being derived and compared with the actual vehicle speed to decide whether shifting is needed or not.

2. Description of the Prior Art

Figure 1:
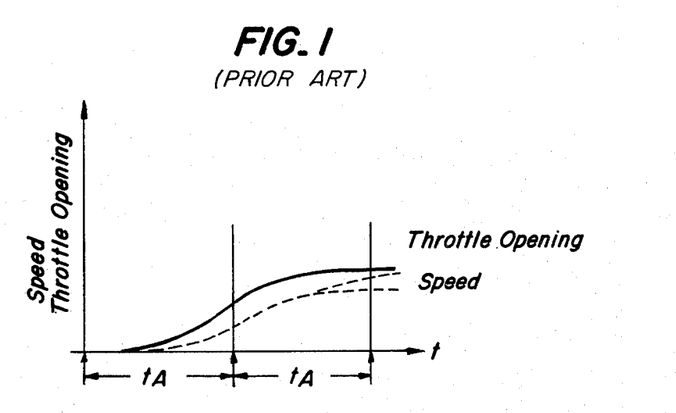
FIG. 1 illustrates a response of the vehicle speed to the throttle opening as a function of time.

In known shift control systems for automatic transmissions of this kind, particularly, in those shift control systems for the automatic transmission using a so-called torque converter, a problem is caused that a time delay is introduced, as shown in FIG. 1, in a relationship between depression of the accelerator pedal and the vehicle speed (i.e. the relationship between the torque and the vehicle speed) owing to slip in the torque converter and inertia of the vehicle, and thus, a reference shifting speed which is unduly low is selected, for example, the first speed is chosen when the second speed should be chosen.

Moreover, a shift control system has already been proposed, wherein the actual acceleration of the vehicle is picked-up from the output signal of the vehicle speed sensor, whereas, from a signal indicative of a shift position of the automatic transmission and the throttle opening and vehicle speed data from the engine load sensor and the speed sensor at that time, a programmed acceleration is determined which is to be attained with the associated shift position, throttle opening and vehicle speed under given running conditions, for example, a running condition on the road having a slope of 5% and that having a slope of 10%. Then, the programmed acceleration thus attained is compared with an actual acceleration detected by the speed signal from the vehicle speed sensor in order to determine continually or at a fixed time interval a desired shift pattern, for example, a running pattern for the flat road with its reference shifting speed being set to be low, a running pattern for the road of a small slope (of larger than or equal to 5%) with its reference shifting speed being set slightly high, or a running pattern for the road of a steep slope (of larger than or equal to 10%) with its reference shifting speed being set to be higher. In the known shift control systems of this type, however, a problem arises in that, when data from the throttle sensor and the speed sensor, in particular, are taken as instantaneous data, as shown in FIG. 1 by a pointer mark ▲ at each of the predetermined time intervals ($t_A$) so that a shift pattern is determined at each predetermined time interval, a programmed acceleration which does not correspond to the true condition of running may be obtained due to a delay in the response of the vehicle speed relative to changes of the throttle opening. For example, in spite of a running condition on a flat road, a shift pattern for running on a slope is selected. Further, in this case, operations of the sensors in vehicles with much noise, vibration, and the like, become astable thereby, and upon reading data into memory means at the fixed time interval, incorrect input data may be read into the memory means. Particularly, when a throttle sensor of the potentiometer type is used, it may happen that its closed contacts are made accidentally open because of the vibration and even that no input data is read into the memory means. Consequently, there is a problem in that an incorrect shift pattern is selected based upon the erroneous input data as described above, whereby shifting which is not matched to the running condition of the vehicle is carried out. In particular, such a problem is encountered that when input data which is subject to fluctuations due to the vibration of the vehicle is read into the memory means at every fixed time interval in succession, a shift pattern to be selected is also caused to be varied at every fixed time interval in sequence, which may even lead to a sequence of sudden shifting, for example, sequential shifting of the second speed to the third speed and then to the second speed, so that the vehicle becomes very uncomfortable to ride in.

The principal object of the invention is to obviate, among the various disadvantages as described above, a particular one which is caused by the delay in the response of the vehicle speed relative to variations of the throttle opening. To this end, the shift control system according to the invention comprises means for extracting an item of speed data from the speed sensor, which appears at an instant delayed by a predetermined period of time from a corresponding item of throttle opening data and is used for a decision of necessity or non-necessity of shifting or for determination of a programmed acceleration instead of the speed data at the same instant as the corresponding throttle opening data.

Consequently, deviation of the speed data from the true running condition due to delay in response of the vehicle speed relative to depression of the accelerator pedal can be compensated for, and the disadvantages as mentioned above can be eliminated.

In such a shift control system wherein the shift pattern is determined by the programmed acceleration, the problems that any undesired shift pattern may be selected owing to variations of the throttle opening data and the speed data by vibration of the vehicle, etc. can be solved by averaging these data at every fixed time interval. In this case the problem which is caused by a delay of the response of the vehicle speed in relation to the depression of the accelerator pedal can be removed by delaying a time interval for detection of an averaged value of the speed from that for detection of an averaged value of the throttle opening by a predetermined amount of time.

DESCRIPTION OF THE PREFERRED EMBODIMENT

Figure 2:
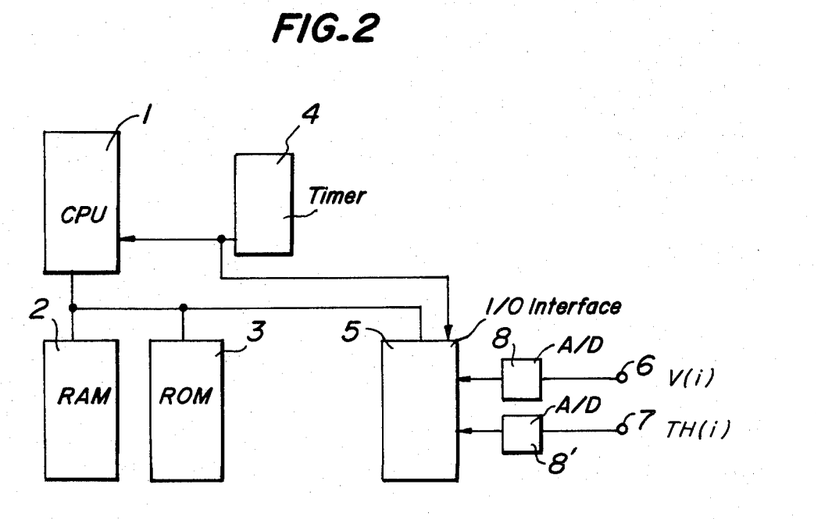
FIG. 2 is a block diagram of a preferred embodiment of the shift control system for an automatic transmission in accordance with the invention.

FIG. 2 shows a block diagram of an embodiment of a shift control system for an automatic transmission in accordance with the invention. This embodiment is implemented by using a microcomputer and examples of its control program are illustrated in FIGS. 3 and 4, respectively.

In FIG. 2, reference numeral 1 designates a central processing unit (CPU), numeral 2 refers to a random access memory (RAM), numeral 3 designates a read only memory (ROM), reference numeral 4 refers to a timer, numeral 5 refers to an external input/output interface unit, numeral 6 designates an input terminal for a speed signal from a vehicle speed sensor, numeral 7 refers to an input terminal for a signal which is fed from a throttle sensor to indicate a throttle opening, and numerals 8 and 8' designate analog-to-digital converters, respectively.

Figure 3:
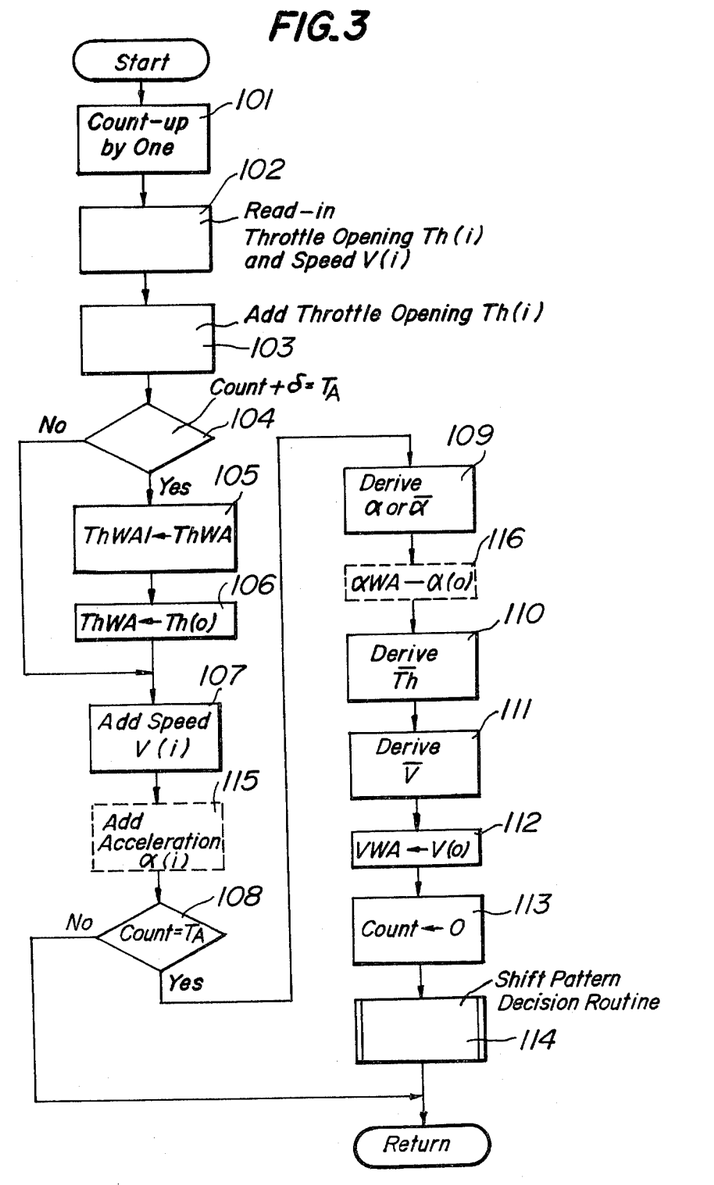
FIG. 3 is an example of a flow chart of a control program which is applied to the system in FIG. 2.
Figure 4:
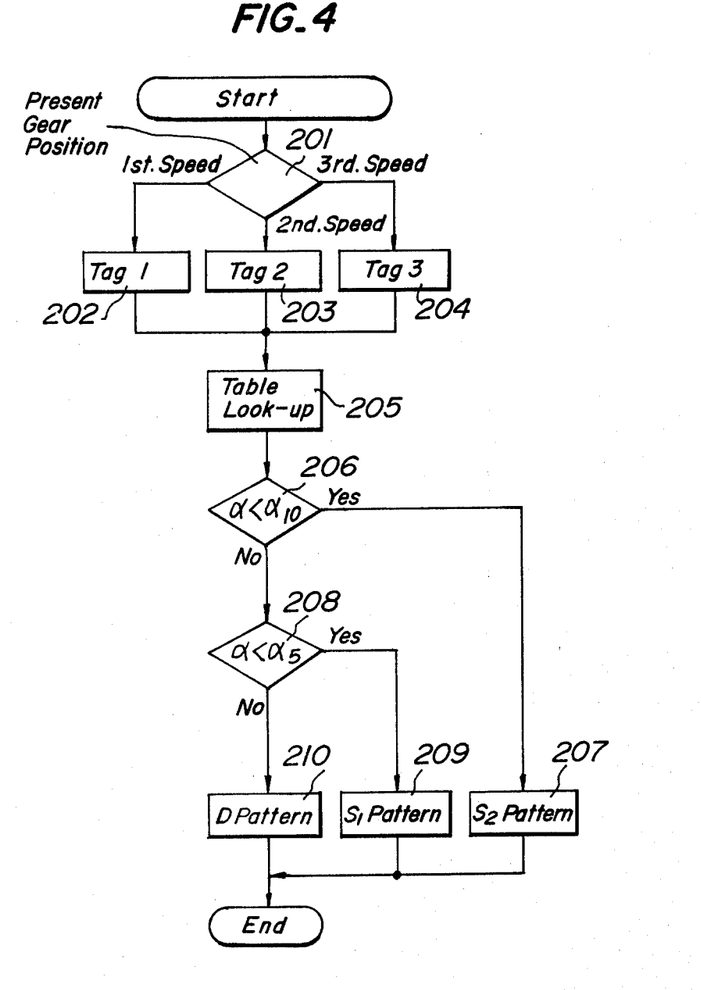
FIG. 4 is an example of a flow chart of a shift pattern decision routine shown in FIG. 3.

At first, a routine with averaged values of the throttle opening and the vehicle speed are obtained, respectively, will be explained by referring to a flow chart of the control program as shown in FIG. 3. In the embodiment these averaged values of the throttle opening and the vehicle speed are obtained in a manner such that instantaneous values of the throttle opening and the speed at each of the sub-time intervals $t_B$ involved within a predetermined time interval $t_A$ are integrated and their resultant total sums are divided by the number $T_A$ of the sub-time intervals $t_B$ included within the time interval $t_A$ (i.e. $t_A = T_A \cdot t_B$) to derive the averaged values at every time interval $t_A$, whereupon the time intervals for derivation of the averaged throttle opening and vehicle speed are shifted from each other by a period of time $t_\delta (= \delta \cdot t_B)$.

At the beginning of the control program, each time the CPU 1 receives an interruption signal from the timer 4 at each of predetermined sub-time intervals $t_B$, the CPU operates to count up the count of a counter in the RAM 2 by one as indicated by block 101. At the same time, in block 102 data for the vehicle speed and that for the throttle opening which are respectively supplied to the input terminals 6 and 7 from the speed sensor and the throttle sensor and converted into digital form by the analog-to-digital converters 8 and 8', respectively, are read into the RAM 2 through the input/output interface unit 5 at each sub-time interval $t_B$. As designated in blocks 103 and 104, the throttle opening data (Th) and the speed data (V) thus read are added in succession and their adding results are stored in memory locations for a resultant sum ThWA and VWA in the RAM 2, respectively. When the counter of the RAM 2 reaches a count of $T_A - \delta$, the control of the CPU 1 goes from block 104 to block 105, where the total sum of the throttle opening data Th(i) stored in a memory location for the resultant sum ThWA is read out and stored into a memory location ThWA1 of the RAM 2. At the same time, in block 106 the throttle opening data at an instant corresponding to said count is set into the resultant sum memory location ThWA as an initial value Th(0). On the other hand, in block 107, until the counter reaches a count of $T_A$ the vehicle speed data is integrated in succession. When the count equals to $T_A$, the control process proceeds from block 108 to block 109, where a change of the vehicle speed within the time interval $t_A$, that is to say, an acceleration $\alpha$ within the time interval $t_A$ is given from an initial value V(0) and a final value $V(T_A)$ of the speed data stored in the RAM 2 by the following equation:

$$\alpha = \frac{V(T_A) - V(O)}{T_A}$$

Moreover, in block 110 the total sum of the throttle opening data which is stored in the memory location ThWA1 of the RAM 2 at each of the total number $T_A$ of the sub-time intervals $t_B$ within the time interval $t_A$ between instants $t - t_\delta$ and $t + (t_A - t_\delta)$ is read out, and from it an averaged value of the throttle opening $\overline{Th}$ within the time interval $t_A$ is obtained by the following equation:

$$\overline{Th} = \frac{\sum_{i=-\delta}^{T_A - \delta} Th(i)}{T_A}$$

Also, in block 111 the total sum of the vehicle speed data which is stored in the memory location of resultant sum VWA of the RAM 2 at each of the total number $T_A$ of the sub-time intervals $t_B$ within the time interval $t_A$ between instants t and $t + t_A$ is read out, and therefrom an averaged value $\overline{V}$ of the speed within the time interval $t_A$ is derived from the following equation:

$$\overline{V} = \frac{\sum_{i=0}^{T_A} V(i)}{T_A}$$

Then, in block 112 the speed data at the end of said time interval is set into the memory location VWA as an initial value V(0) for the next time interval $t_A$. Subsequently, in block 113 the content of the counter is reset to zero. Finally, the control process arrives at block 114, where a shift pattern is determined from the averaged throttle opening $\overline{Th}$, the averaged speed $\overline{V}$ and the acceleration $\alpha$ thus obtained.

Figure 6:
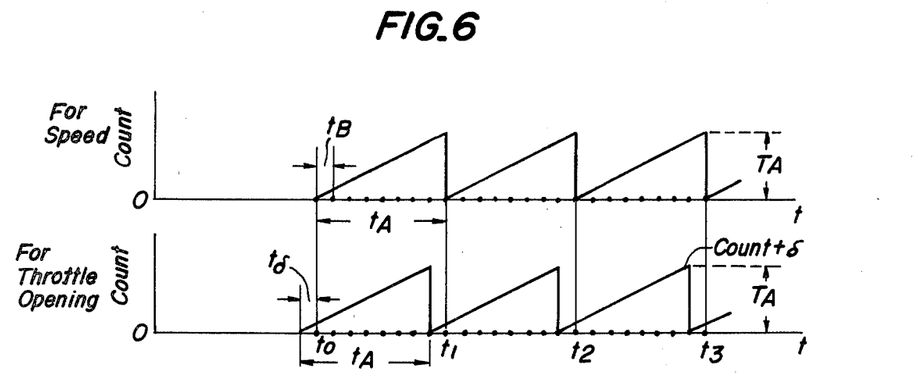
FIG. 6 illustrates a relationship between a fixed time interval to detect an averaged value of the vehicle speed and that to detect an averaged value of the throttle opening.

It can be seen from the above that in the embodiment the routine to derive the total sum of the speed data for the time interval $t_A$ is repeated each time the counter reaches the count of $T_A$, whereas the routine to obtain the total sum of the throttle opening data for the interval $t_A$ is recurred each time a summation of the count of the counter and $+\delta$ becomes equal to $T_A$. This means that a period $t_A$ for detecting the total sum of the throttle opening appears to be earlier than a period $t_A$ to detect the total sum of the speed by an amount of time $t_\delta = \delta t_B$ (its one example is shown in FIG. 6, wherein $\delta = 1$, i.e. $t_\delta = t_B$ and $T_A = 8$, i.e. $t_A = 8t_B$), and also that an averaged value of the throttle opening which is obtained at the count of $T_A$ is an averaged value for a time interval $t_A$ which precedes the time interval to derive an averaged value of the speed by an amount of time $t_\delta = \delta t_B$ (at times of $t_0, t_1, t_2, \ldots$ in FIG. 6).

It should be noted that upon digital computation in accordance with the equations recited before, it is advantageous to select a value of $T_A$ or the ratio between $t_A$ and $t_B$ to not only an integer but also a power of two, because in the latter case the division by such divisors in said equations can be carried out by merely shifting bit positions of a binary number corresponding to the divisor in the denominator of said equations. Moreover, in the above example, the acceleration $\alpha$ is not taken as an average for the time interval $t_A$. However, the acceleration can also be obtained as an averaged acceleration in the time interval $t_A$ in a manner such that respective accelerations for a sequence of sub-time intervals $t_B$ within the time interval $t_A$ are taken at each of the sub-time intervals $t_B$ and a mean value thereof is derived from a total sum of said those accelerations. In this case it is executed as shown in block 115 represented by a broken line that up to the count $T_A$ an acceleration $\alpha(i)$ for the sub-time interval $t_B$ is taken from successive vehicle speed data read into at each sub-time interval $t_B$ in accordance with the following equation:

$$\alpha(i) = \frac{V(i) - V(i-1)}{t_B},$$

and a total sum thereof is obtained by adding it sequentially and is stored in a memory location for the resultant sum $\alpha AW$ in the RAM 2. At the end of the time interval $t_A$ as shown in block 109, an averaged acceleration $\overline{\alpha}$ in the time interval $t_A$ can be obtained from the total sum of the respective accelerations in each sub-time interval $t_B$ within the time interval $t_A$ in accordance with the following equation:

$$\overline{\alpha} = \frac{\sum_{i=0}^{n-1} \alpha(i)}{T_A}.$$

Then, at the count $T_A$ as indicated by a broken line block 115, an acceleration for the last sub-time interval $t_B$ of the time interval $t_A$ which is taken at the end of the latter is stored as an initial value $\alpha(0)$ of acceleration data for the next time interval $t_A$ in a corresponding memory location of the RAM.

Now, the manners in which a shift portion can be determined through a shift pattern decision routine in block 112 from the averaged throttle opening $\overline{Th}$, the averaged vehicle speed $\overline{V}$ and the acceleration $\alpha$ or $\overline{\alpha}$ obtained as described above will be explained below.

FIG. 4 illustrates an example of the shift pattern decision routine in detail, wherein at first, in block 201 a signal representing a present shift position of the automatic transmission is derived, and in block 202 in case of the first speed, in block 203 in case of the second speed or in block 204 in case of the third speed a heading address (Tag 1, Tag 2 or Tag 3) in a table of programmed accelerations which are stored for respective shift positions in the ROM 3 (FIG. 2), respectively, is determined.

Figure 5A:
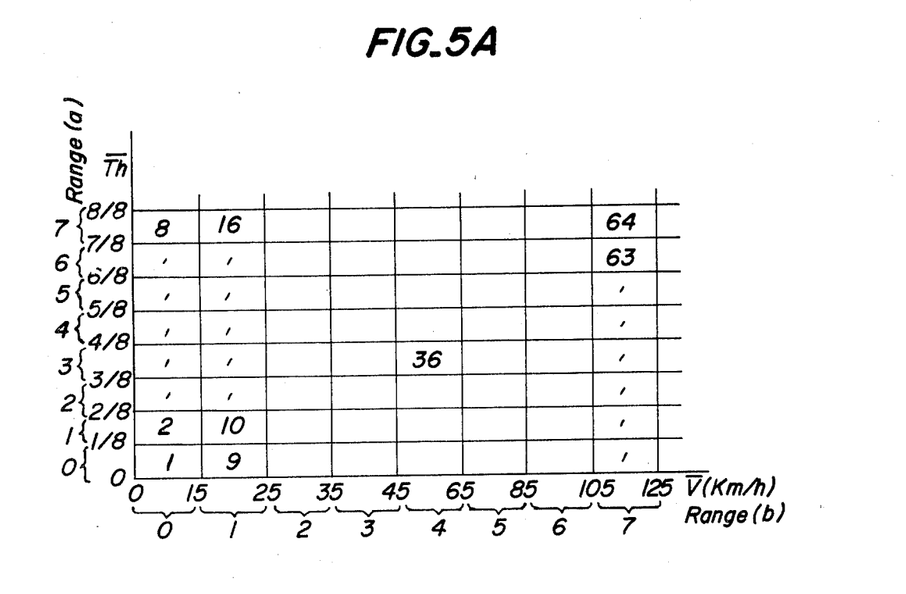
FIG. 5A shows diagrammatically an example of numbering to various running conditions of the vehicle as a function of averaged speed and throttle opening in their respective ranges.
Figure 5B:
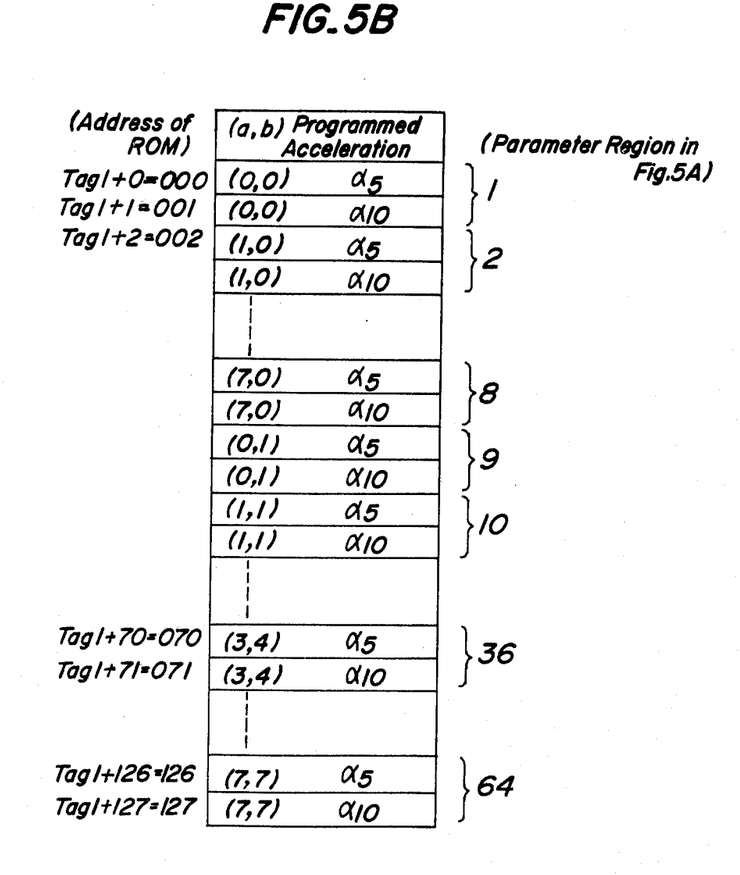
FIG. 5B shows an example of a table of programmed accelerations stored in ROM in connection with FIG. 5A.

The programmed accelerations are stored previously in the ROM 3, for example, as shown in FIG. 5B in case of the first speed. That is to say, the throttle opening and the vehicle speed (the averaged values $\overline{Th}$ and $\overline{V}$ in accordance with the invention) are equally divided into eight ranges by a factor of eight, respectively, and range numbers 0–7 are assigned to the throttle opening ranges and the vehicle speed ranges, respectively, as shown in FIG. 5A. Subsequently, the programmed accelerations, for example, the programmed accelerations $\alpha_5$ and $\alpha_{10}$ which are to be obtained for each throttle opening range and each vehicle speed range at each shift position upon running on the road of 5% and 10% slopes are stored previously in specified addresses of the ROM 3 for each shift position, as shown in FIG. 5B. Assuming that a heading address of the programmed acceleration table for the first speed in the ROM 3 is Tag 1 and that said ranges for the averaged throttle opening $\overline{Th}$ and those for the averaged speed $\overline{V}$ are represented by a and b, respectively, addresses $\Phi_1$ and $\Phi_1'$ for the programmed accelerations $\alpha_5$ and $\alpha_{10}$ corresponding to the respective ranges of the averaged values $\overline{Th}$ and $\overline{V}$ at this shift position may be addresses as expressed by the following equations, respectively:

for $\alpha_5 \ldots \Phi_1 = 2a + 16b + $ Tag 1 and for $\alpha_{10} \ldots \Phi_1' = 2a + 16b + $ Tag $1 + 1$.

Therefore, the addresses $\Phi_1$ and $\Phi_1'$ of the accelerations $\alpha_5$ and $\alpha_{10}$ for a first parameter region or block 1 corresponding to a range set (0, 0) of the averaged values $\overline{Th}$ and $\overline{V}$ shown in FIG. 5A, are Tag $1 = 000$ and Tag $1 + 1 = 001$ as shown in FIG. 5B, respectively. Moreover, the addresses $\Phi_1$ and $\Phi_1'$ of the accelerations $\alpha_5$ and $\alpha_{10}$ for a thirty-sixth parameter region or block 36 corresponding to a range set (3, 4) in FIG. 5A are Tag $1 + 70 = 070$ and Tag $1 + 71 = 071$, respectively.

Similarly, the programmed accelerations $\alpha_5$ and $\alpha_{10}$ corresponding to the respective ranges of said throttle opening and vehicle speed $\overline{Th}$ and $\overline{V}$ for the third speed upon running on the 5% and 10% slope road are stored previously in the following addresses $\Phi_2$ and $\Phi_2'$, respectively:

for $\alpha_5 \ldots \Phi_2 = 2a + 16b + $ Tag 2 and for $\alpha_{10} \ldots \Phi_2' = 2a + 16b + $ Tag $2 + 1$.

Also, the programmed accelerations $\alpha_5$ and $\alpha_{10}$ corresponding to the respective ranges of the values $\overline{Th}$ and $\overline{V}$ for the third speed upon running on the 5% and 10% slope road are stored previously in the following addresses $\Phi_3$ and $\Phi_3'$, respectively:

for $\alpha_5 \ldots \Phi_3 = 2a + 16b + \text{Tag } 3$ and for $\alpha_{10} \ldots \Phi_3' = 2a + 16b + \text{Tag } 3 + 1$.

Thus, in block 205 of FIG. 4, table look-up of the programmed accelerations $\alpha_5$ and $\alpha_{10}$ from the ROM 3 which correspond to the present values of the averaged throttle opening and vehicle speed $\overline{Th}$ and $\overline{V}$ at the present shift position, respectively, is executed in accordance with the addresses as defined above from the information of the shift position determined in blocks 202–204, i.e. the heading address Tag 1, Tag 2 or Tag 3 and from the averaged throttle opening and vehicle speed $\overline{Th}$ and $\overline{V}$ taken at each of the aforesaid time intervals $t_4$. In block 206 the actual acceleration $\alpha$ obtained at every time interval $t_4$ is compared with the programmed acceleration $\alpha_{10}$ as read out. If $\alpha > \alpha_{10}$, it is decided that the slope of the road on which the vehicle is running is larger than 10%, and in block 207 a shift pattern $S_2$ for running on the road of more than 10% slope is chosen in which pattern a reference shifting speed at each shift position is set to be higher. On the other hand, if $\alpha > \alpha_{10}$, that is to say, the slope of the road being traveled by the vehicle is smaller than 10%, the actual acceleration $\alpha$ is compared in block 208 with the programmed acceleration $\alpha_5$. If $\alpha > \alpha_5$, that is to say, the slope of the road being traveled by the vehicle is larger than 5%, a shift pattern $S_1$ is chosen in block 209, in which pattern a reference shifting speed at each shift position is set to be slightly higher so as to be suitable for running on the road of more than 5% slope. If $\alpha > \alpha_5$, i.e. the slope of the road being traveled by the vehicle is smaller than 5%, a shift pattern D for running on the flat road is chosen in block 210, in which pattern a reference shifting speed at each shift position is set to be lower.

In the embodiment of the invention as described above, the period for which the speed to be averaged is detected is delayed by a predetermined amount of time ($t_\delta$) from the period for which the throttle opening to be averaged is detected. As a result, selection of any incorrect shift pattern due to delay in response to the speed relative to depression of the throttle pedal can be avoided, and a shift pattern which is matched to the actual running condition is always selected. In addition, it can be removed to select any incorrect shift pattern which may happen when a shift pattern is determined by instantaneous values of the throttle opening, the vehicle speed and the acceleration at each of fixed time intervals. Moreover, even when the accelerator pedal is depressed unconsciously or momentarily by the driver, the shift pattern is not caused to be changed because variations of the throttle opening due to such a very short term depression of the accelerator pedal are averaged.

It will be evident that the invention is not limited to the embodiments in the Figures and various changes in form and details may be made within the scope of the invention. For example, said predetermined time ($t_\delta$) is variably settable in response to the shift position and the actual speed. The table look-up of programmed accelerations from the ROM 3 may be realized in the form of hardware by using an associative memory without addressing as referred to FIG. 5. In another method it is possible to obtain desired programmed accelerations by arithmetic operation through proper arithmetic equations from values of the averaged throttle opening and vehicle speed Th and V. It should be noted that in the embodiment shown in FIG. 2 the timer 104 is provided externally of the CPU 1, however, interruption without the timer 104 may be effected internally of the CPU 1 by the latter itself in the form of a software timer. In such an embodiment, the total sum of the throttle opening data, which is derived earlier by the time $t_\delta$ than that of the speed data, is stored in the RAM for the time $t_\delta$, and when the counter reaches the count $T_A$, averaged values of both of the throttle opening and the speed are obtained simultaneously. However, it will be evident that the averaged value of the throttle opening may be obtained previously and stored in the RAM for the time period of $t_\delta$. As described above, averaged values are suitable for the throttle opening and speed data, respectively. However, it is apparent that instead of averaging these throttle opening and vehicle speed data for the fixed time intervals in staggered fashion, instants at which sequential speed data is detected may be delayed by the predetermined time from instants at which successive throttle opening data is detected.

What is claimed is:

1. In a shift control system for a vehicle automatic transmission comprising engine load sensor means for producing a signal corresponding to the engine load; vehicle speed sensor means for producing a signal corresponding to an actual vehicle speed; and means responsive to said signals from both of said engine load sensor means and said speed sensor means for selecting a reference shifting speed corresponding to an associated engine load from a predetermined relationship between the engine load and a plurality of reference shifting speeds, for comprising said selected reference shifting speed with the actual vehicle speed and for deciding whether shifting is needed or not, the improvement comprising means for extracting from said speed sensor signal a signal which corresponds to said engine load sensor signal and appears after a predetermined amount of time from said corresponding engine load sensor signal, said signal as extracted being used in said deciding means upon a decision of the necessity of shifting.

2. A shift control system as claimed in claim 1, wherein said extracting means comprises means for providing averaged signals within a predetermined time interval for said speed sensor signal and for said engine load sensor signal, respectively, in a manner such that the time interval for averaging said speed sensor signal follows that for averaging said engine load sensor signal after said predetermined amount of time.

3. A shift control system as claimed in claim 2, wherein said averaged signals from said speed sensor means and said engine load sensor means are obtained in a manner such that values of said speed sensor signal and said engine load sensor signal are derived and accumulated at each of a plurality of sub-time intervals within said predetermined time interval, and subsequently the vehicle speed sensor signal values and the engine load sensor signal values as accumulated are divided by the number of said sub-time intervals included in said predetermined time interval, respectively.

4. In a shift control system for a vehicle automatic transmission comprising engine load sensor means for producing a signal corresponding to the engine load;

vehicle speed sensor means for producing a signal corresponding to an actual vehicle speed; means responsive to the signals from said engine load sensor means and said vehicle speed sensor means and a signal indicative of an associated shift position of the automatic transmission for determining a programmed acceleration corresponding to the engine load, the actual vehicle speed and the associated shift position; means responsive to the signal from said engine load sensor means for producing an actual acceleration; and means responsive to said programmed acceleration and said actual acceleration for selecting a desired one of two or more kinds of predetermined relationships between the engine load and a plurality of reference shifting speeds, a reference shifting speed corresponding to a relevant engine load given from the selection relationship between the engine load and the reference shifting speeds being derived and compared with the actual vehicle speed to decide whether shifting is needed or not, the improvement comprising means for extracting from said speed sensor signal a signal which corresponds to said engine load sensor signal and appears after a predetermined amount of time, said signal as extracted being used in said determining means upon a determination of a programmed acceleration.

5. A shift control system as claimed in claim 4, wherein said extracting means comprises means for providing averaged signals within a predetermined time interval for said speed sensor signal and for said engine load sensor signal, respectively, in a manner such that the time interval for averaging said speed sensor signal follows that for averaging said engine load sensor signal after said predetermined amount of time.

6. A shift control system as claimed in claim 5, wherein said actual acceleration is obtained in a manner such that values of the acceleration are derived and accumulated at each of sub-time intervals within said predetermined time interval and the values as accumulated are divided by the number of said sub-time intervals involved within said predetermined time interval.

* * * * *